(12) United States Patent
Leitner (10) Patent No.: US 9,806,600 B2
(45) Date of Patent: Oct. 31, 2017

(54) POWER CONVERTERS CONTROLLED TO SHUT DOWN IN RESPONSE TO MONITORED PARAMETERS REACHING THRESHOLDS FOR A PERIOD OF TIME

(71) Applicant: Emerson Network Power, Energy Systems, North America, Inc., Warrenville, IL (US)

(72) Inventor: John H. Leitner, Elyria, OH (US)

(73) Assignee: VERTIV ENERGY SYSTEMS, INC., Lombard, IL (US)

( * ) Notice: Subject to any disclaimer, the term of this patent is extended or adjusted under 35 U.S.C. 154(b) by 0 days.

(21) Appl. No.: 14/869,465

(22) Filed: Sep. 29, 2015

(65) Prior Publication Data

US 2017/0040886 A1 Feb. 9, 2017

Related U.S. Application Data (60) Provisional application No. 62/200,437, filed on Aug. 3, 2015.

(51) Int. Cl.
*H02M 3/15* (2006.01)
*H02M 3/335* (2006.01)
(Continued)

(52) U.S. Cl.
CPC .............. *H02M 1/36* (2013.01); *H02M 1/32* (2013.01); *H02M 3/156* (2013.01); *H02M 3/157* (2013.01);
(Continued)

(58) Field of Classification Search
CPC .. H02M 3/157; H02M 3/158; H02M 3/33515; H02M 2001/0012; H02M 7/04
See application file for complete search history.

(56) References Cited

U.S. PATENT DOCUMENTS 4,200,830 A   4/1980   Oughton et al.
4,709,320 A   11/1987  Konopka
(Continued)

FOREIGN PATENT DOCUMENTS

CN          104578325       *  4/2015

OTHER PUBLICATIONS

English Translation of CN104578325;Electric vehicle charging system and application method thereof; Zheng Weixiong; Apr. 29, 2015.*

(Continued)

*Primary Examiner* — Timothy J Dole
*Assistant Examiner* — Ishrat Jamali
(74) *Attorney, Agent, or Firm* — Harness, Dickey & Pierce, P.L.C.

(57) ABSTRACT

A power system for powering a load including a power converter and a control circuit coupled to the power converter. The power converter includes an input terminal for receiving an input voltage and an input current, and output terminal for outputting an output voltage and an output current to a load. The control circuit is configured to monitor the output voltage and the output current of the power converter and shut down the power converter in response to the output voltage being less than or equal to a defined voltage threshold and the output current being greater than or equal to a defined current threshold for a defined period of time. Other example power systems, control circuits, and methods of controlling power converters are also disclosed.

20 Claims, 5 Drawing Sheets

(51) Int. Cl.

| | | |
|---|---|---|
| *H02M 1/36* | (2007.01) | |
| *H02M 3/157* | (2006.01) | |
| *H02M 7/04* | (2006.01) | |
| *H02M 3/158* | (2006.01) | |
| *H02M 1/32* | (2007.01) | |
| *H02M 3/156* | (2006.01) | |
| *H02M 1/00* | (2006.01) | |

(52) U.S. Cl.
 CPC ....... *H02M 3/158* (2013.01); *H02M 3/33515* (2013.01); *H02M 7/04* (2013.01); *H02M 2001/0012* (2013.01)

(56) References Cited

U.S. PATENT DOCUMENTS

| | | | |
|---|---|---|---|
| 5,225,815 A | | 7/1993 | Bocquet et al. |
| 5,499,154 A | | 3/1996 | Cullison |
| 5,635,827 A | * | 6/1997 | Judd ..................... H02B 1/052 323/321 |
| 5,712,779 A | | 1/1998 | Sheppard et al. |
| 6,856,098 B2 | | 2/2005 | Piaskowski |
| 7,148,660 B2 | | 12/2006 | Ghosh et al. |
| 7,518,889 B2 | | 4/2009 | Baurle et al. |
| 7,787,271 B2 | | 8/2010 | Popescu et al. |
| 7,956,762 B2 | | 6/2011 | Bailey et al. |
| 7,995,317 B2 | | 8/2011 | Norman |
| 8,072,783 B2 | | 12/2011 | Morbe et al. |
| 8,670,255 B2 | | 3/2014 | Gong et al. |
| 8,755,200 B2 | | 6/2014 | Clemo et al. |
| 8,924,170 B2 | | 12/2014 | Bengtsson et al. |
| 9,048,737 B2 | | 6/2015 | Jeong et al. |
| 2009/0167279 A1 | * | 7/2009 | Wei .......................... H02J 1/102 323/304 |
| 2010/0064124 A1 | * | 3/2010 | Rinne ................... H02M 3/157 713/1 |

OTHER PUBLICATIONS

Centurion II Power System; 48 Volt, 1000 Watt Rectifier Installation/Operation Manual; Newmar; Oct. 2010; 14 pages.

DIRS-4110 Power Supply Shelf Operation Manual; Dongah Elecomm; May 30, 2010; 21 pages.

RM2048XE 2.0kW 48V DC Modular Rectifiers; Enatel Energy; 2012; 2 pages.

NetSure Rectifier Module User Instructions; Emerson Network Power; Issue AG; Nov. 20, 2012; 28 pages.

Rectifier Monitoring Application Brief; Kentrox; 2013; 3 pages.

Sageon Micro 24V Series Rectifier; C&D Technologies; 2008; 4 pages.

\* cited by examiner

POWER CONVERTERS CONTROLLED TO SHUT DOWN IN RESPONSE TO MONITORED PARAMETERS REACHING THRESHOLDS FOR A PERIOD OF TIME

CROSS-REFERENCE TO RELATED APPLICATION

This application claims the benefit and priority of U.S. Provisional Application No. 62/200,437 filed Aug. 3, 2015. The entire disclosure of the above application is incorporated herein by reference.

FIELD

The present disclosure relates to power converters and methods for controlling power converters.

BACKGROUND

This section provides background information related to the present disclosure which is not necessarily prior art.

Power converters such as rectifiers provide power to a load. Typically, these power converters include components to protect themselves and/or the load from undesirable circumstances. For example, the power converters are sometimes controlled to shut down (e.g., latch off) when its regulated output voltage falls below a particular setpoint.

SUMMARY

This section provides a general summary of the disclosure, and is not a comprehensive disclosure of its full scope or all of its features.

According to one aspect of the present disclosure, a power supply includes a power system for powering a load. The power system includes a power converter and a control circuit coupled to the power converter. The power converter includes an input terminal for receiving an input voltage and an input current, and output terminal for outputting an output voltage and an output current to a load. The control circuit is configured to monitor the output voltage and the output current of the power converter and shut down the power converter in response to the output voltage being less than or equal to a defined voltage threshold and the output current being greater than or equal to a defined current threshold for a defined period of time.

According to another aspect of the present disclosure, a method of controlling a power converter includes shutting down a power converter in response to an output voltage of the power converter being less than or equal to a defined voltage threshold and an output current of the power converter being greater than or equal to a defined current threshold for a defined period of time.

According to another aspect of the present disclosure, a control circuit for controlling a power converter is configured to couple to a power converter, to monitor an output voltage and an output current of the power converter, and to shut down the power converter in response to the output voltage being less than or equal to a defined voltage threshold and the output current being greater than or equal to a defined current threshold for a defined period of time.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, a method of controlling a rectifier includes shutting down the rectifier in response to the output voltage being less than (<) to a defined voltage threshold and an output current of the rectifier being greater than (>) a defined current threshold for a defined period of time.

In some embodiments, the rectifier may be shut down in response to the output voltage being less than or equal to (≤) a defined voltage threshold and the output current being greater than or equal to (≥) a defined current threshold for a defined period of time.

Figure 1:
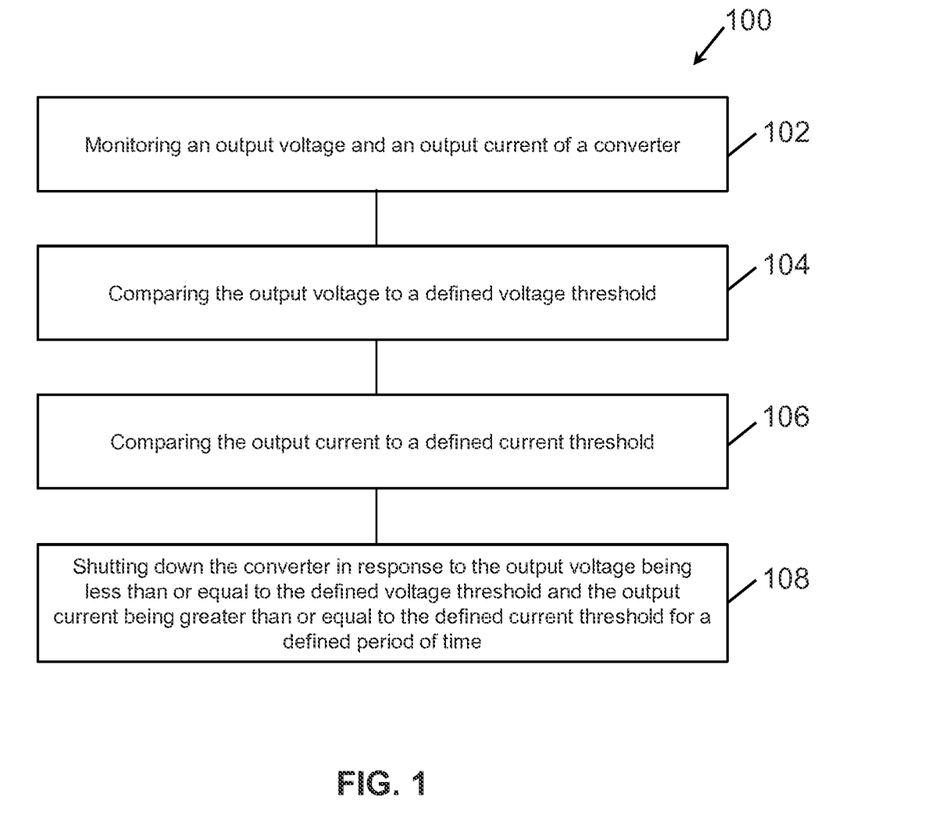
FIG. 1 is a flow chart of a method for shutting down a rectifier according to one example embodiment of the present disclosure.

In other embodiments, the method may include monitoring (e.g., sensing, sampling, etc.) one or more rectifier parameters and comparing these parameters to defined thresholds. For example, a method for controlling a rectifier according to one example embodiment of the present disclosure is illustrated in FIG. 1, and indicated generally by reference number 100. As shown in FIG. 1, the method 100 includes monitoring (e.g., sensing, sampling, etc.) an output voltage and an output current of a rectifier (block 102) and comparing the output voltage and the output current to a defined voltage threshold and a defined current threshold, respectively, (blocks 104, 106). The method 100 further includes shutting down the rectifier in response to the output voltage being less than or equal to the defined voltage threshold and the output current being greater than or equal to the defined current threshold for a defined period of time (block 108).

Thus, and as explained herein, the rectifier is shut down (e.g., latched off, etc.) thereby disabling its output when the voltage condition, the current condition, and the period of time condition are met.

Figure 2:
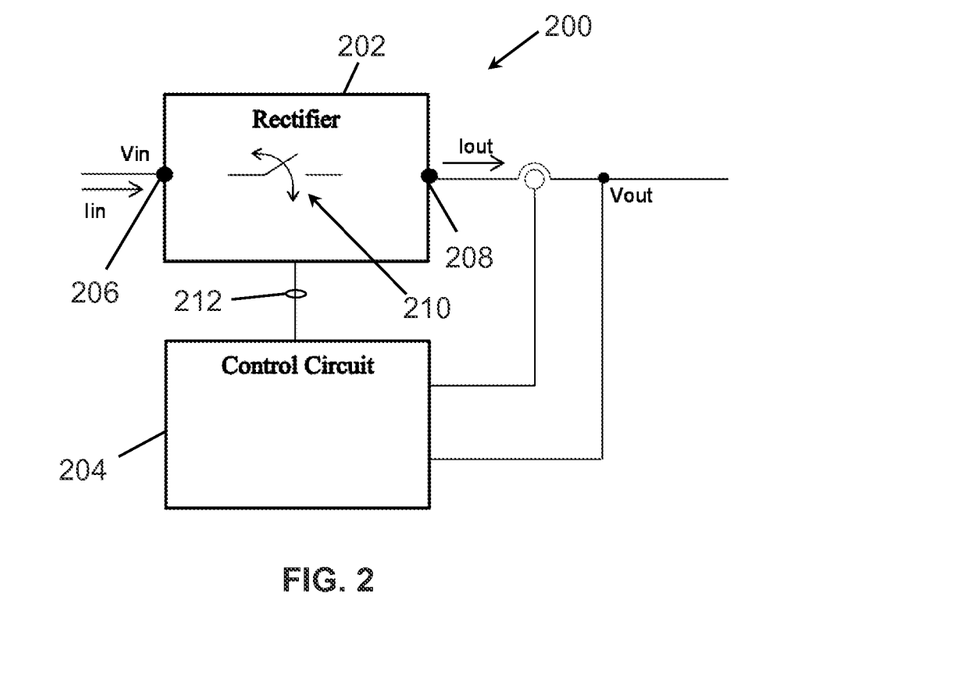
FIG. 2 is a block diagram of a power system including a rectifier and a control circuit for shutting down and restarting the rectifier according to another example embodiment.

The methods disclosed herein may be implemented by a power system including any suitable rectifier. For example, FIG. 2 illustrates a power system 200 including a rectifier 202 and a control circuit 204 coupled to the rectifier 202. The rectifier 202 includes an input terminal 206 for receiving an input voltage Vin and an input current Iin, and an output terminal 208 for outputting an output voltage Vout and an output current Iout to a load (not shown). The control circuit 204 is configured to monitor the output voltage Vout and the output current Iout of the rectifier 202 and shut down the rectifier 202 in response to the output voltage Vout being less than or equal to a defined voltage threshold (e.g., a voltage setpoint) and the output current Iout being greater than or equal to a defined current threshold (e.g., a current setpoint) for a defined period of time as further explained below.

After the rectifier 202 is shut down (e.g., latched off), a power source can be disconnected from and then reconnected to the input terminal 206 of the rectifier 202. For example, after the rectifier 202 is shut down, a user may manually disconnect the power source from the rectifier 202. After a period of time, the user can manually reconnect the power source to the input terminal 206 of the rectifier 202. This disconnection and reconnection may be done, for example, by opening and closing a breaker between the power source and the rectifier 202. In some examples, the user can wait a defined period of time so that residual voltage stored in one or more components (e.g., capacitors, etc.) of the rectifier 202 can fall to substantially zero, monitor this residual voltage, etc. Once this residual voltage is substantially zero, the user can reconnect the power source to the input terminal 206. In other embodiments, a control circuit (e.g., the control circuit 204, etc.) may disconnect and/or reconnect the power source and the rectifier 202. This cycling of the input may cause the rectifier 202 to reset and/or possibly correct one or more condition(s) causing the undesirable output current Iout and output voltage Vout.

After the power source is reconnected, the control circuit 204 will restart the rectifier 202. At this time, the control circuit 204 can again monitor the output voltage Vout and the output current Iout of the rectifier 202, and shut down the rectifier 202 as before.

The control circuit 204 may shut down and/or restart the rectifier 202 by providing a control signal 212 to the rectifier 202. For example, and as shown in FIG. 2, the rectifier 202 includes a switching device 210 that receives the control signal 212 for shutting down and/or restarting the rectifier 202. In some embodiments, the switching device 210 may be one or more power switches of the rectifier 202 used to converter AC power into DC power. In other embodiments, the switching device 210 may be a disable/enable switch that disconnects/connects the output terminal 208 of the rectifier 202 and the load. This disable/enable switch can be on an input side and/or an output side of the output terminal 208.

In some example embodiments, one or more current protection devices employed for the rectifier 202 may be adjusted, removed, etc. when the control methods disclosed herein are employed. For example, the rectifier 202 may include current limit fold-back functionality which causes the output voltage Vout and the output current Iout to decrease in response to the load exceeding a maximum current. In such cases, the control circuit 204 may fix a current limit of the fold-back functionality. Thus, in the event the current limit fold-back functionality is triggered (which causes the output voltage Vout and the output current Iout to decrease), the output current Iout will not fall below the fixed current limit. Consequently, the output voltage Vout will stop decreasing when the output current Iout reaches this fixed current limit. As such, the output voltage Vout will not decrease below the defined voltage threshold which may cause the rectifier 202 to shut down as explained herein due to the current limit fold-back functionality.

This fixed current limit may be based on, for example, the defined voltage threshold. For example, the fixed current limit may be set such that the output voltage Vout will not decrease below the defined voltage threshold when the current limit fold-back functionality is triggered. In some embodiments, this fixed current limit may be below the defined current threshold. For example, the fixed current limit may be about 40 A or another suitable value and the defined current threshold may be about 44.6 A (as explained herein).

In some embodiments, the control circuit 204 may activate an alarm (not shown in FIG. 2) in response to the rectifier 202 being shut down and/or restarted. For example, the control circuit 204 can activate a visual indicator, an audible indicator, and/or another suitable alarm when the rectifier 202 shuts down. The visual indicator may include, for example, energizing one or more LEDs continuously, periodically, randomly, etc. The LEDs may include, for example, a red LED that indicates the rectifier 202 has shut down (when the LED is energized). The audible indicator may include, for example, a continuous, periodic, random, etc. audible noise.

The alarm may be positioned adjacent the rectifier 202 and/or the control circuit 204. For example, one or more LEDs may be positioned on an exterior case of the rectifier 202 so that it is visible to a user passing by. Additionally and/or alternatively, the alarm may be positioned in a control room remote from the rectifier 202 and/or the control circuit 204. In such examples, the control circuit 204 may send a signal to the alarm notifying a user in the control room that the rectifier 202 has shut down and/or restarted.

Figure 3:
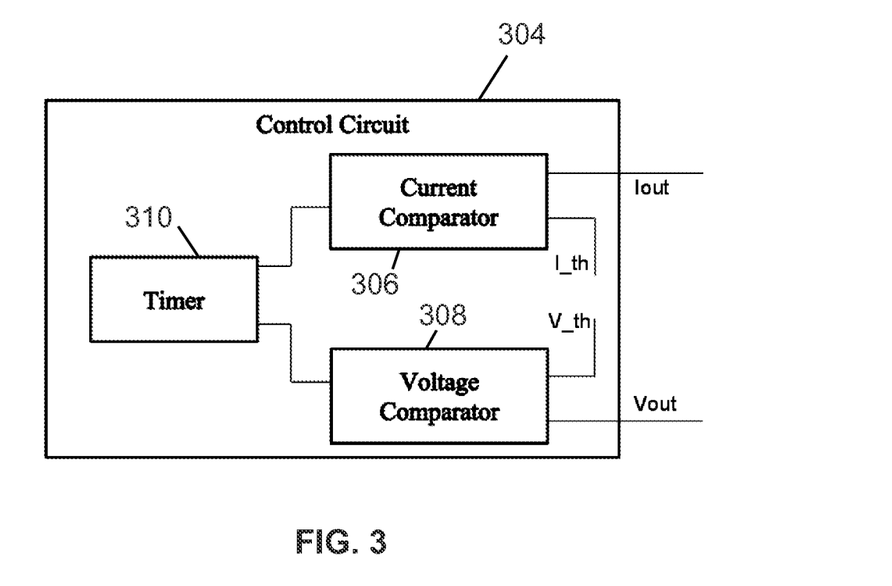
FIG. 3 is a block diagram of a control circuit including comparators and a timer according to yet another example embodiment.

The control circuit 204 may include one or more components for comparing the outputs (e.g., the output voltage Vout and the output current Iout) and the defined thresholds, and/or for determining an elapsed time. For example, and as shown in FIG. 3, a control circuit 304 includes a current comparator 306, a voltage comparator 308, and a timer 310. The control circuit 304 may be employed in the power system 200 of FIG. 2 and/or another suitable power system having a power converter as explained herein.

As shown in FIG. 3, the current comparator 306 receives inputs representing a defined current threshold I_th and an output current Iout as explained above. Likewise, the voltage comparator 308 receives inputs representing a defined voltage threshold V_th and an output voltage Vout as explained above.

The timer 310 of FIG. 3 determines an elapsed time. For example, the timer 310 may receive a signal from each comparator 306, 308, another component, etc. indicating the state of each comparator 306, 308 (and therefore whether the voltage condition and the current condition are met). In such examples, the timer 310 will not begin until the voltage condition and the current condition are met as explained above. Additionally, the timer 310 may stop if one of the conditions (i.e., either the voltage condition or the current condition) is not met.

When the timer 310 reaches a defined period of time (e.g., as explained above), the timer 310 may output a signal to its corresponding rectifier, another component in the control circuit 304, etc. to latch-off the rectifier. For example, the timer 310 may include a comparator, be coupled to a comparator, etc. to compare the elapsed time and the defined period of time as explained above.

Similarly, the timer 310 may include another comparator, be coupled to another comparator, etc. to compare an elapsed time and a defined period of time related to the restarting the rectifier as explained herein.

Although FIG. 3 illustrates one timer 310 for determining an elapsed time for different events (e.g., latching off a rectifier, starting a rectifier, etc.), it should be understood that more than one timer may be employed. For example, the control circuit 304 may include one timer for determining an elapsed time related to latching off a rectifier and one timer for determining an elapsed time related to restarting the rectifier.

Figure 6:
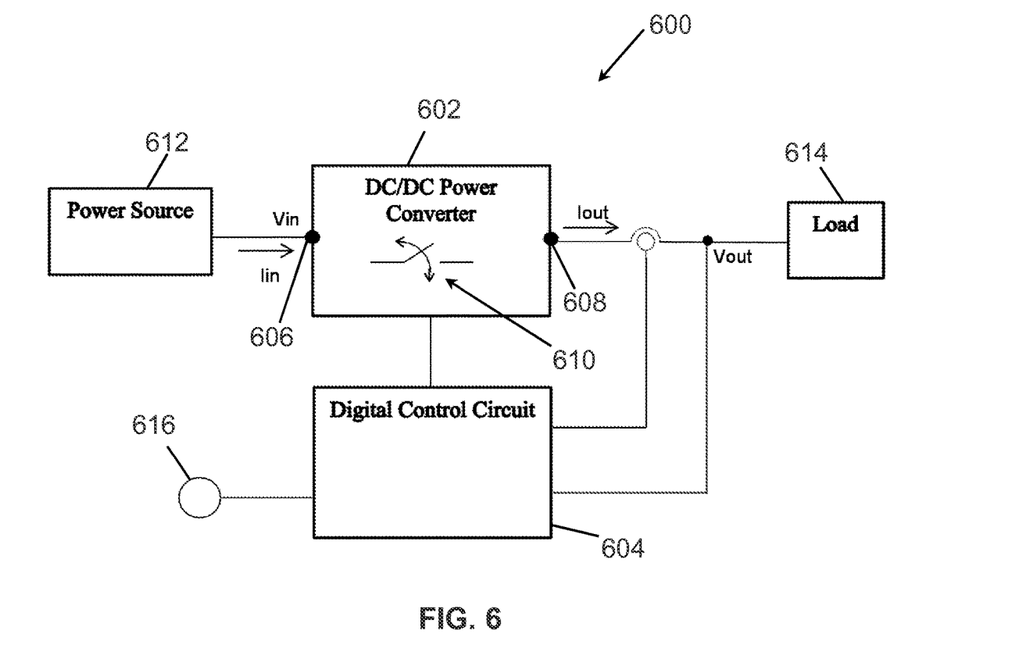
FIG. 6 is a block diagram of a power system including a DC/DC power converter and a digital control circuit for shutting down and restarting the DC/DC power converter according to yet another example embodiment.

As further explained below, the methods disclosed herein may also be implemented by a power system including another suitable converter. For example, FIG. 6 illustrates a power system 600 substantially similar to the power system 200 of FIG. 2. The power system 600 of FIG. 6, however, includes a DC/DC power converter 602 coupled to a power source 612 via an input terminal 606 and a load 614 via an output terminal 608. Additionally, the power system 600 includes a digital control circuit 604 that functions substantially similar as the control circuit 204 of FIG. 2.

Additionally, and as shown in FIG. 6, the DC/DC power converter 602 includes one or more switching devices 610. The switching device(s) 610 may represent power switch(es) of the DC/DC power converter 602, disable/enable switch (es) that disconnects/connects the output terminal 608 to the load 614 and/or the input terminal 606 from/to the power source 612, etc. These disable/enable switch(es) can be on an input side and/or an output side of the output terminal 208 and/or the input terminal 606.

As shown in FIG. 6, the power system 600 includes an alarm 616 coupled to the digital control circuit 604. The alarm 616 may be activated in response to the DC/DC power converter 602 being shut down and/or restarted as explained above. In the example of FIG. 6, the alarm 616 is a visual indicator.

Figure 4:
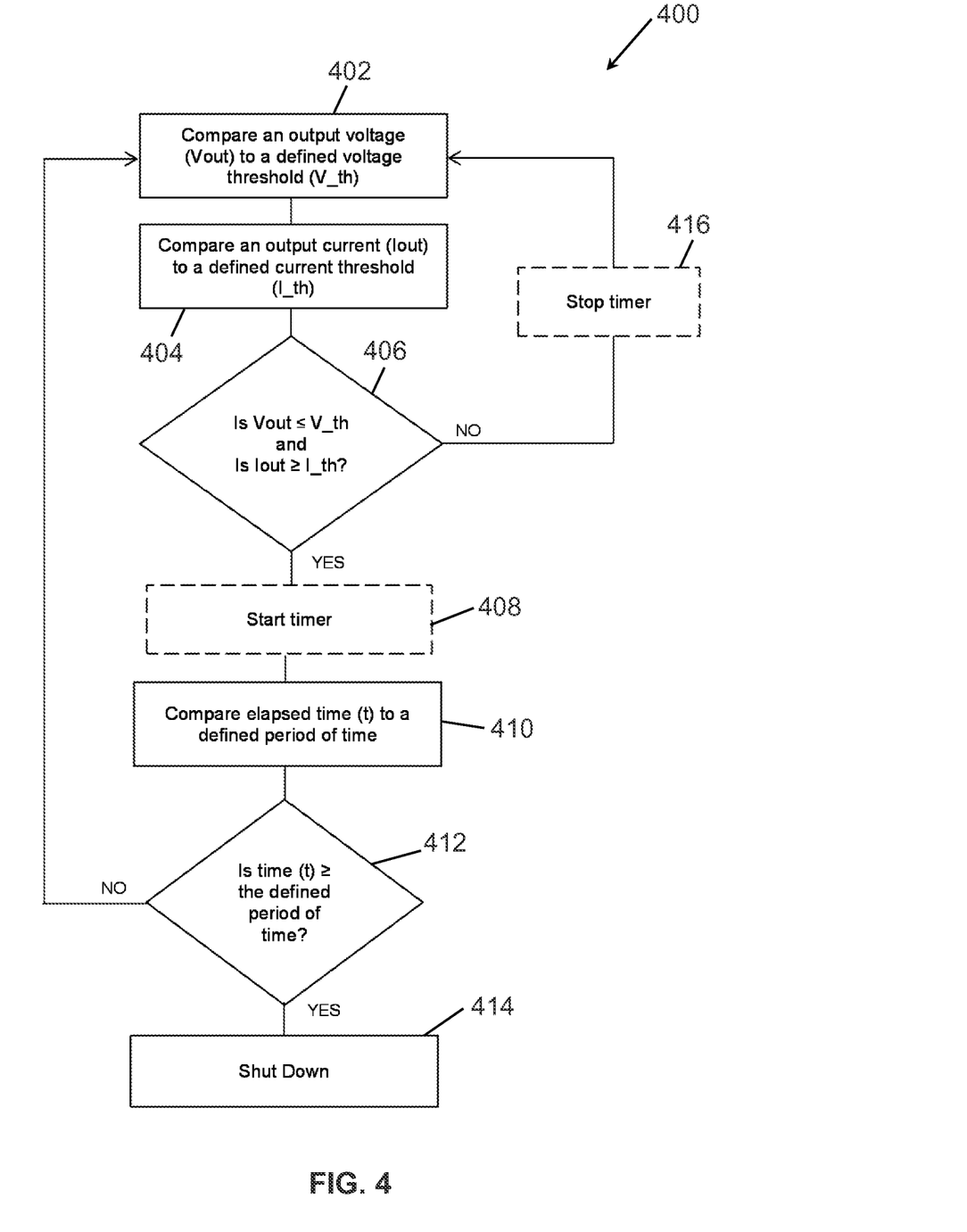
FIG. 4 is a flow chart of a method for shutting down the rectifier of FIG. 2, according to another example embodiment.
Figure 5:
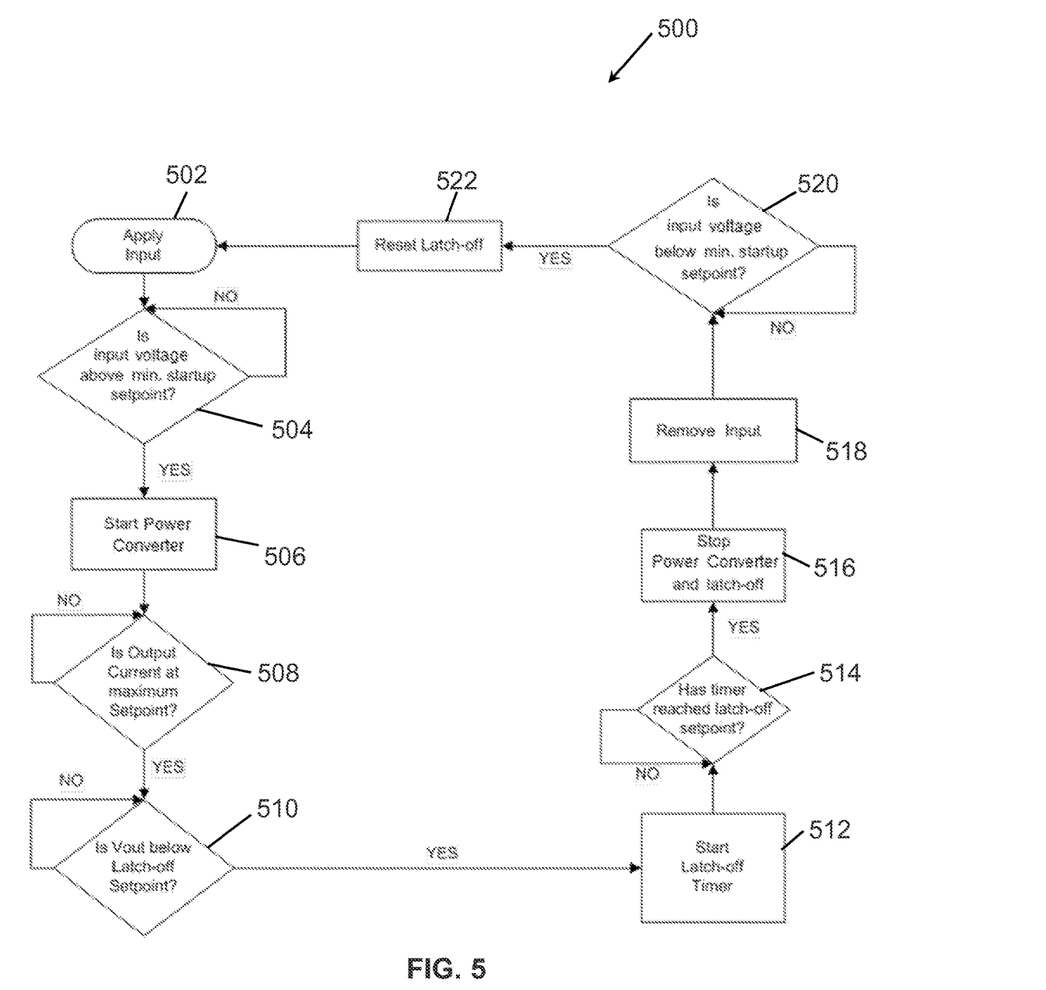
FIG. 5 is a flow chart of a method for shutting down and restarting a power converter according to another example embodiment.

FIGS. 4 and 5 illustrate example flow charts for controlling the rectifier 202 of FIG. 2, and/or another suitable power converter such as the DC/DC power converter 602 of FIG. 6, another rectifier, etc. In particular, FIG. 4 illustrates a flow chart 400 for shutting down the rectifier 202 of FIG. 2 and FIG. 5 illustrates a flow chart 500 for shutting down and restarting a power converter.

As shown in FIG. 4, the flow chart 400 includes comparing an output voltage Vout to a defined voltage threshold V_th and comparing an output current Iout to a defined current threshold I_th (blocks 402, 404) as explained herein. If the output voltage Vout less than or equal to the voltage threshold V_th and the output current Iout is greater than or equal to the defined current threshold I_th (block 406), a timer is started (block 408).

The timer accrues an elapsed time (t) which is compared to a defined period of time (block 410). If the elapsed time (t) is greater than or equal to the defined period of time (block 412), the rectifier 202 is shut down (block 414) as explained herein.

If, however, the elapsed time (t) is less than the defined period of time in block 412, the output voltage Vout and the output current Iout is compared to the defined voltage threshold V_th and the defined current threshold I_th again (blocks 402, 404). If the above mentioned voltage condition and current condition remain true (block 406), the elapsed time (t) continues to accrue from its starting point (e.g., bypassing the start timer block 408), and the new elapsed time (t) is compared to the defined period of time (block 410).

However, if one of the voltage condition and the current condition explained above is not true at any point (block 406), the timer is stopped (block 416). For example, if the output voltage Vout is greater than the voltage threshold V_th, or if the output current Iout is less than the defined current threshold I_th (block 406), the timer is stopped.

After which, the output voltage Vout and the output current Iout can be compared (again) to the voltage threshold V_th and the defined current threshold I_th (blocks 402, 404). If the timer has not been started, the stop timer block 416 is bypassed. After the rectifier 202 shuts down (block 414 of FIG. 4), a process for restarting the rectifier 202 may be commenced, as explained herein.

As explained above, the flow chart 500 of FIG. 5 illustrates another example process for shutting down 1 and restarting a power converter. As shown in FIG. 5, an input is applied to a power converter (block 502). For example, a power source may be coupled to an input of the power converter such that the power converter receives an input voltage (e.g., an AC input voltage or a DC input voltage) from the power source. For instance, the power source 612 of FIG. 6 may be connected to the input terminal 606 of the DC/DC power converter 602 via switching device(s) 610 as explained above.

If the input voltage is above a minimum startup voltage setpoint (e.g., a voltage threshold), the power converter is started (blocks 504, 506). If the input voltage is not above a startup voltage setpoint (block 504), the power converter is not started and the input voltage is evaluated again to determine if the input voltage is above the minimum startup voltage setpoint.

After the power converter is started (block 506), an output current of the power converter is compared to a maximum current setpoint (e.g., a defined current threshold). If the output current is below the maximum current setpoint (block 508), the output current is evaluated again to determine if the output current is at or above the maximum current setpoint. If the output current is at or above the maximum current setpoint (block 508), an output voltage of the power converter is compared to a latch-off voltage setpoint (e.g., a defined voltage threshold).

If the output voltage is above the latch-off voltage setpoint (block 510), the output voltage is evaluated again to determine if the voltage is below the latch-off voltage setpoint. If the output voltage of the power converter is below the latch-off voltage setpoint (block 510), a latch-off timer is started (block 512). Thus, once both the output voltage of the power converter is below the latch-off voltage setpoint (block 510) and the output current is at or above the maximum current setpoint (block 508), the latch-off timer is started (block 512) as explained herein.

The latch-off timer is monitored to determine if the elapsed time has reached a latch-off time setpoint (e.g., a defined period of time). Once the elapsed time has reached the latch-off time setpoint (block 514), the power converter is latched off (block 516) as explained herein, and therefore does not provide an output. Thus, for the power converter to latch-off, both the output voltage of the power converter is below the latch-off voltage setpoint (block 510) and the output current is at or above the maximum current setpoint (block 508) for a defined period of time as explained herein.

At this time, the input voltage may be removed from the input of the power converter (block 518). For example, and as shown in FIG. 6, the power source 612 providing the input voltage may be disconnected (e.g., manually disconnected, etc.) from the input terminal 606 of the DC/DC power converter 602 in response to the power converter being latched off (e.g., shut down) as explained above. After the AC input voltage is removed, residual voltage stored in one or more components of the power converter can fall to substantially zero as explained above.

Once the AC input voltage is removed (block 518), the input voltage of the power converter may be compared to a minimum startup voltage setpoint (block 520). This minimum startup voltage setpoint of block 520 may be the same or a different value than the minimum startup voltage setpoint of block 504.

If the input voltage is below the minimum startup voltage setpoint (block 520), the latch-off condition is reset (block 522). For example, the latch-off condition can be reset by one or more appropriate control signals provided by the control circuit 604 of FIG. 6. Once the latch-off condition is reset (block 522), the input can be applied to the power converter again (block 502) as explained above. If the output current and the output voltage of the power converter satisfy the conditions in blocks 508, 510, the latch-off timer of block 512 will be started again as explained above.

If, however, the input voltage is above the startup voltage setpoint (block 520), the latch-off condition is not reset and the power converter is not started. In such examples, the input voltage is evaluated again as explained above. Thus, in the example of FIG. 5, the latch-off condition is not automatically reset.

The comparisons between (a) the output current and the defined current threshold disclosed herein (e.g., the maximum current setpoint of FIG. 5), (b) the output voltage and the defined voltage threshold disclosed herein (e.g., latch-off voltage setpoint of FIG. 5), and/or (c) the elapsed time and the defined period of times disclosed herein (e.g., the latch-off time setpoint of FIG. 5) can be periodic, random, or a combination thereof. Additionally, these comparisons can be continuously evaluated until, for example, a power converter is latched off. For example, if the output current of FIG. 5 falls below the maximum current setpoint (block 508) and/or the output voltage of FIG. 5 is above the latch-off voltage setpoint (block 510) at any given point in time before the power converter is latched off, the method can be reset.

The rectifiers disclosed herein may include any suitable topology without departing from the scope of the present disclosure. For example, the rectifiers may include a full-wave rectifier employing various diodes (e.g., two diodes, four diodes, etc.), various switches (e.g., two transistors, four transistors, etc.), etc. The switches may include transistors such as power MOSFETs, etc.

Further, although the methods disclosed herein are described relative to a rectifier and a generic power converter, it should be understood that the methods may be used to control other power converters such as DC/AC inverters and DC/DC power converters having any suitable topology (e.g., a buck topology, a boost topology, a buck-boost topology; a full bridge topology, a half bridge topology, etc.) without departing from the scope of the present disclosure. The power converters (including the rectifiers disclosed herein) may regulate its output (e.g., an output voltage, etc.) at a particular setpoint (e.g., about 380 VDC).

The defined periods of time disclosed herein related to the rectifiers (or other power converters) shutting down (e.g., the shut down period of time) and the defined periods of time disclosed herein related to the rectifiers (or other power converters) restarting (e.g., the restart period of time) may be any suitable period of time. The periods of time may be the same or different. For example, the restart period of time may be less than the shut down period of time. In some embodiments, the restart period of time may be about 115 milliseconds and the shut down period of time may be about five minutes.

The defined voltage thresholds disclosed herein and the defined current thresholds disclosed herein may be any suitable value. For example, the defined thresholds may depend (at least partially) on the power converter being controlled, a load coupled to the power converter, etc. In some embodiments, the defined current threshold may be about 44.6 A or another suitable value, and the defined voltage threshold may be about 270V or another suitable value. Additionally, the defined thresholds may be predefined and stored in memory of the control circuit, may be adjustable based on one or more parameters, etc.

The control circuits disclosed herein may include an analog control circuit, a digital control circuit (e.g., a digital signal controller (DSC), a digital signal processor (DSP), etc.) as shown in FIG. 6, or a hybrid control circuit (e.g., a digital control unit and an analog circuit). For example, the digital control circuit may include memory to store one or more of the various thresholds (e.g., the setpoints) if desired.

Additionally, it should be understood to those skilled in the art that one or more portions of the control circuits may be a digital control circuit disposed on an integrated circuit (IC). Further, the control circuits may be a control circuit within a power module (or the like) including a rectifier. In other embodiments, the control circuits may be external a power module.

The systems and/or methods disclosed herein may be employed in any suitable application including, for example, telecommunication applications, information technology applications, etc. For example, the systems and/or methods may be employed in one or more battery backup units and/or another suitable power supply of a power system, DC systems providing low and/or high voltage (e.g., 5 VDC, 12 VDC, 24 VDC, 48 VDC, 270 VDC, 400 VDC, etc.), etc. The systems may be employed in enclosures (e.g., data racks, server cabinets, etc.) including, for example, stationary and/or modular enclosures.

By employing the systems and/or methods disclosed herein, a power converter may be shut down in the event a fault occurs (e.g., on the power converter's output) that may not be detected in other protection systems. For example, the methods may cause a power converter to disconnect power from a load when the power converter's current is insufficient to trip a current protection device on the power converter's output. By doing so, the possibility of fire, electrical shock, etc. caused by the fault may be reduced compared to other known systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power system for powering a load, the power system comprising:
   a power converter having an input terminal for receiving an input voltage and an input current, and output terminal for outputting an output voltage and an output current to a load, and
   a control circuit coupled to the power converter, the control circuit configured to monitor the output voltage and the output current of the power converter and shut down the power converter in response to the output voltage being less than or equal to a defined voltage threshold for a defined period of time and the output current being greater than or equal to a defined current threshold for the defined period of time.

2. The power system of claim 1 wherein the control circuit includes a digital control circuit.

3. The power system of claim 2 wherein the control circuit is configured to disconnect a power source from the input terminal of the power converter in response to the power converter being shut down.

4. The power system of claim 3 wherein the defined period of time is a first defined period of time and wherein the control circuit is configured to connect the power source to the input terminal of the power converter after a second defined period of time from when the power source was disconnected.

5. The power system of claim 4 wherein the second defined period of time is about 115 milliseconds.

6. The power system of claim 2 wherein the defined voltage threshold is a first defined voltage threshold and wherein the control circuit is configured to restart the power converter in response to the input voltage of the power converter being below a second defined voltage threshold.

7. The power system of claim 2 wherein the control circuit is configured to shut down the power converter and activate an alarm in response to the output voltage being less than or equal to the defined voltage threshold and the output current being greater than or equal to the defined current threshold for the defined period of time.

8. The power system of claim 7 wherein the alarm includes a visual indicator.

9. The power system of claim 1 wherein the power converter includes a rectifier.

10. The power system of claim 9 wherein the defined current threshold is about 44.6 A.

11. The power system of claim 9 wherein the defined voltage threshold is about 270V.

12. The power system of claim 9 wherein the defined period of time is about five minutes.

13. A method of controlling a power converter, the method comprising:
    shutting down a power converter in response to an output voltage of the power converter being less than or equal to a defined voltage threshold for a defined period of time and an output current of the power converter being greater than or equal to a defined current threshold for the defined period of time.

14. The method of claim 13 further comprising monitoring the output voltage and the output current of the power converter.

15. The method of claim 13 wherein the power converter includes a rectifier.

16. The method of claim 13 wherein shutting down the power converter includes activating an alarm.

17. The method of claim 13 furthering comprising disconnecting a power source from an input terminal of the power converter in response to the power converter being shut down.

18. The method of claim 17 wherein the defined period of time is a first defined period of time, the method further comprising connecting the power source to the input terminal of the power converter after a second defined period of time after from when the power source was disconnected.

19. The method of claim 13 wherein the defined voltage threshold is a first defined voltage threshold, the method further comprising restarting the power converter in response to an input voltage of the power converter being below a second defined voltage threshold.

20. A control circuit for controlling a power converter, the control circuit configured to monitor an output voltage and an output current of the power converter, and to shut down the power converter in response to the output voltage being less than or equal to a defined voltage threshold for a defined period of time and the output current being greater than or equal to a defined current threshold for the defined period of time.

\* \* \* \* \*